United States Patent
Zhang et al.

(10) Patent No.: US 11,218,371 B2
(45) Date of Patent: Jan. 4, 2022

(54) METHOD AND APPARATUS FOR PERFORMING COMMUNICATION IN INTERNET OF THINGS

(71) Applicant: Telefonaktiebolaget LM Ericsson (publ), Stockholm (SE)

(72) Inventors: Fengpei Zhang, Guangzhou (CN); Yun Zhang, Beijing (CN); Minyi Wang, Guangzhou (CN); Jingrui Tao, Guangzhou (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 17/266,416

(22) PCT Filed: Jun. 1, 2018

(86) PCT No.: PCT/CN2018/089557
§ 371 (c)(1),
(2) Date: Feb. 5, 2021

(87) PCT Pub. No.: WO2019/227473
PCT Pub. Date: Dec. 5, 2019

(65) Prior Publication Data
US 2021/0297309 A1 Sep. 23, 2021

(51) Int. Cl.
*H04L 12/24* (2006.01)
*G16Y 30/00* (2020.01)
(Continued)

(52) U.S. Cl.
CPC ............ *H04L 41/082* (2013.01); *G16Y 30/00* (2020.01); *G16Y 40/35* (2020.01);
(Continued)

(58) Field of Classification Search
CPC ....... H04L 41/082; H04L 45/02; H04L 67/12; H04L 41/0816; G16Y 40/35; G16Y 30/00
See application file for complete search history.

(56) References Cited

U.S. PATENT DOCUMENTS

2010/0179940 A1* 7/2010 Gilder ................... G06F 16/258
707/622
2011/0202909 A1* 8/2011 Meijer ...................... G06F 8/45
717/151

FOREIGN PATENT DOCUMENTS

WO 2013037216 A1 3/2013

OTHER PUBLICATIONS

International Search Report and Written Opinion dated Feb. 27, 2019 for International Application No. PCT/CN2018/089557 filed on Jun. 1, 2018, consisting of 7-pages.
(Continued)

*Primary Examiner* — Kim T Nguyen
(74) *Attorney, Agent, or Firm* — Christopher & Weisberg, P.A.

(57) ABSTRACT

The present disclosure provides a method performed in a server for communication in Internet of Things, including: receiving, from an application, an object definition schema including an attribute that indicates storing a latest operation message for an operation-related resource item in a client; checking if a queue exists for the operation-related resource item, upon receiving a request for an operation on the operation-related resource item from the application; and if the queue exists, storing the latest operation message in the queue in place of a previous operation message when the client is offline. The present disclosure also provides an apparatus performed in a server for communication in Internet of Things.

20 Claims, 6 Drawing Sheets

(51) Int. Cl.
*G16Y 40/35* (2020.01)
*H04L 12/751* (2013.01)
*H04L 29/08* (2006.01)

(52) U.S. Cl.
CPC .......... *H04L 41/0816* (2013.01); *H04L 45/02* (2013.01); *H04L 67/12* (2013.01)

(56) References Cited

OTHER PUBLICATIONS

D1_Lightweight Machine to Machine Requirements; Open Mobile Alliance, Date—Feb. 8, 2017; consisting of 17-pages.
D2_Lightweight Machine to Machine Architecture; Open Mobile Alliance, Date—Feb. 8, 2017;consisting of 12-pages.
D3_Lightweight Machine to Machine Technical Specification;Open Mobile Alliance, Date—Jul. 4, 2017;consisting of 141-pages.

* cited by examiner

METHOD AND APPARATUS FOR PERFORMING COMMUNICATION IN INTERNET OF THINGS

CROSS-REFERENCE TO RELATED APPLICATION

This application is a Submission Under 35 U.S.C. § 371 for U.S. National Stage Patent Application of International Application Number: PCT/CN2018/089557, filed Jun. 1, 2018 entitled "METHOD AND APPARATUS FOR PERFORMING COMMUNICATION IN INTERNET OF THINGS," the entirety of which is incorporated herein by reference.

TECHNICAL FIELD

The present disclosure relates to the field of Internet of Things (IoT), and more particularly, to a method and apparatus for performing communication in IoT.

BACKGROUND

Open Mobile Alliance (OMA) Lightweight Machine to Machine (LWM2M) is a device management protocol designed for sensor networks and the demands of a machine-to-machine (M2M) environment. M2M environment generally implies numerous and constrained capabilities owing to low cost, small size, low processing power or limited battery life. LWM2M has been specified by a group of industry experts at the Open Mobile Alliance's Device Management Working Group and is based on protocol and security standards from the Internet Engineering Task Force (IETF). With LWM2M, OMA has responded to demand in the market for a common standard for managing lightweight and low power devices on a variety of networks necessary to realize the potential of IoT. The LWM2M protocol, designed for remote management of M2M devices and related service enablement, features a modern architectural design based on Representational State Transfer (REST), defines an extensible resource and data model and builds on an efficient secure data transfer standard called the Constrained Application Protocol (CoAP).

Figure 1:
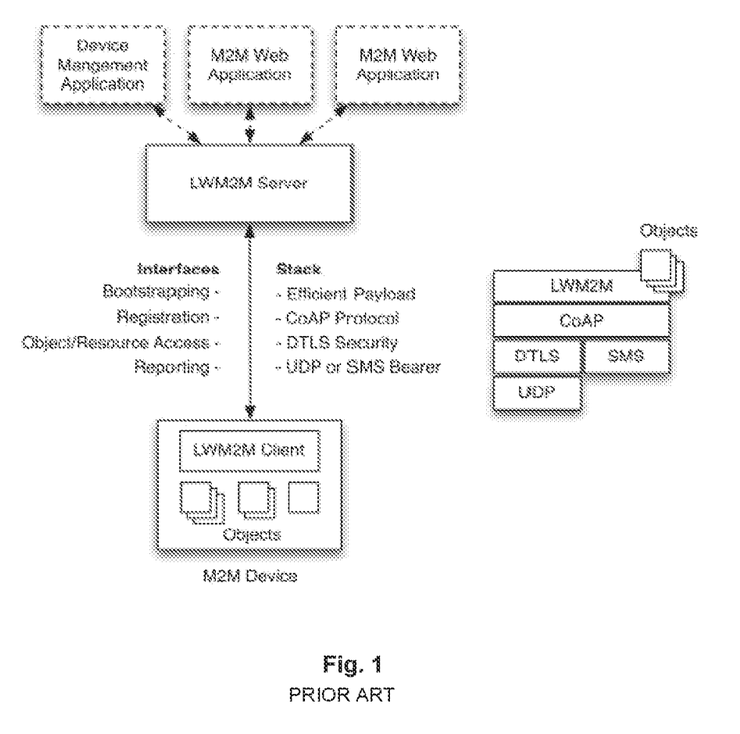
FIG. 1 schematically illustrates a general LWM2M architecture.

Referring to FIG. 1, which schematically illustrates a general LWM2M architecture, the top-level applications, such as Device Management Application, M2M Web Applications, communicating with LWM2M via e.g. HyperText Transfer Protocol (HTTP) based protocols. OMA LWM2M defines the application layer communication protocol between a LWM2M server and a LWM2M client. The LWM2M protocol stack utilizes the IETF Constrained Application Protocol (CoAP) as the underlying transfer protocol over User Datagram Protocol (UDP) and Short Messaging Service (SMS) bearers.

The CoAP is a specialized web transfer protocol designed for M2M applications in constrained nodes and constrained networks. In the present context, the term "constrained" refers to limitations in CPU, memory, and power resources that are inherent to devices which are expected to be used for IoT. CoAP defines message headers, request/response codes, message options, and retransmission mechanisms.

An LWM2M server manages LWM2M clients. An LWM2M client contains various Objects with different Resources. It executes commands sent by the LWM2M servers and then reports the results for device management and the service enablement. Several interfaces are defined between the LWM2M server and the LWM2M client, e.g., bootstrapping is used to set initial configurations on the LWM2M clients. Registration enables LWM2M clients to register with one or more LWM2M servers after bootstrapping of the LWM2M client. Object/Resource access allows the LWM2M server to perform operations on the LWM2M client, etc., and reporting allows the LWM2M client to report information to the LWM2M server in the form of Notifications.

Figure 2:
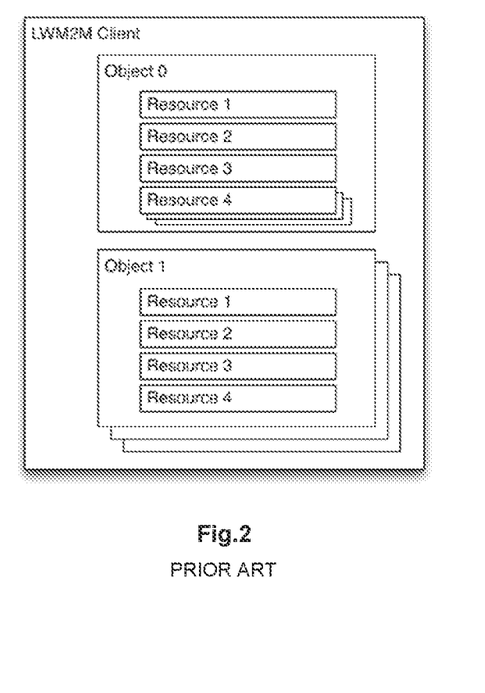
FIG. 2 schematically illustrates a general block diagram of a LWM2M client.

The LWM2M defines a simple resource model where each piece of information made available by the LWM2M client is a Resource. Referring to FIG. 2, which schematically illustrates a block diagram of a LWM2M client, a number of Objects may be included in a LWM2M client, and resources are logically organized into Objects. The LWM2M client may have any number of Resources, each of which belongs to an Object.

Resources and Objects have the capability to have multiple instances of the Resource or Object. A Resource is defined to have one or more operations that it supports. A Resource may consist of multiple instances called a Resource Instance as defined in the Object specification. E.g., the LWM2M server can send a "Write" operation with JavaScript Object Notation (JSON) or Tag Length Value (TLV) format to Resource to instantiate a Resource Instance. The LWM2M client also has the capability to instantiate a Resource Instance.

Figure 3:
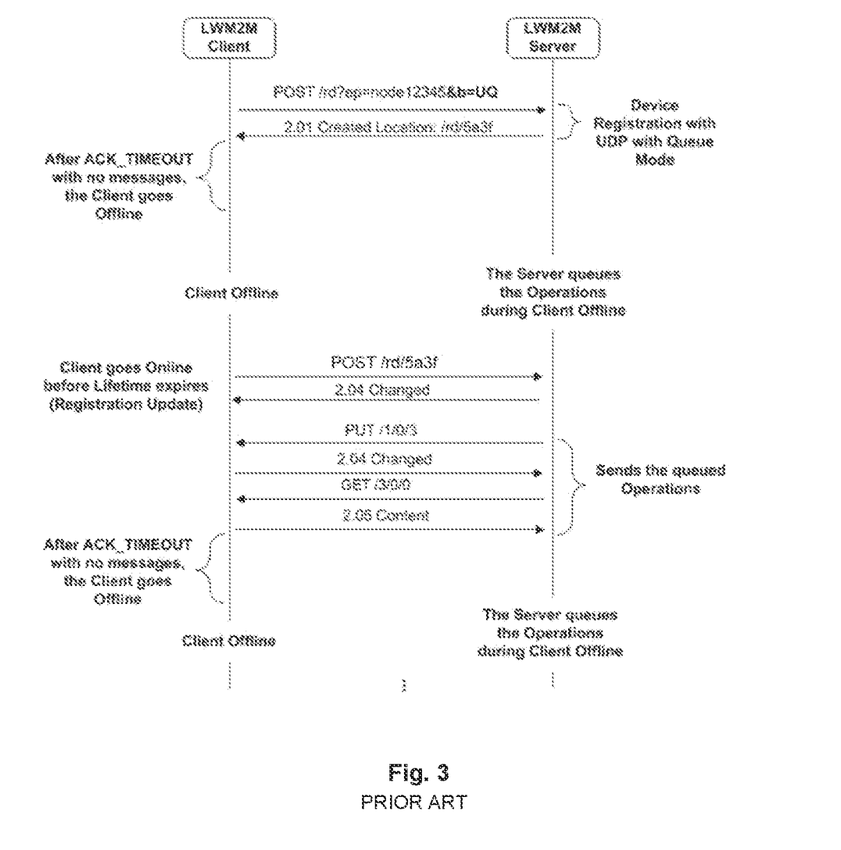
FIG. 3 schematically illustrates a working flowchart between a LWM2M server and a LWM3M client in the prior art.

FIG. 3 schematically illustrates a working flowchart between the LWM2M server and the LWM2M client in the prior art. Generally, when the LWM2M client sends a registration request with a queue mode, the LWM2M server will queue the operations when the client goes offline. Once the client is online again, the LWM2M server sends the queued operations to the client.

However, in some scenarios, especially in the case that the constrained device (e.g., the LWM2M client) sleeps for a long-time period and a large number of queued operations sent from the LWM2M server are produced, this may sometimes lead to a lot of useless and redundant operations to be performed and waste network resources and the power of the LWM2M client.

SUMMARY

In view of the above, an objective of the present disclosure is to provide a method and an apparatus to enhance the current LWM2M queue mode so as to mitigate or eliminate at least one of the above problems.

Embodiments of the present disclosure provide a method and an apparatus to enhance the LWM2M queue mode by supporting store-latest messaging service. This can simplify the implementation of the LWM2M Applications and constrained devices (i.e., LWM2M clients) and improve the power consumption of constrained devices since less messages may be delivered to them.

In one aspect, there is provided a method performed in a server for communication in Internet of Things. The method comprises: receiving, from an application, an object definition schema including an attribute that indicates storing a latest operation message for an operation-related resource item in a client, checking if a queue exists for the operation-related resource item, upon receiving a request for an operation on the operation-related resource item from the application, and if the queue exists, storing the latest operation message in the queue in place of a previous operation message when the client is offline.

With the method of the disclosure, the implementation of the LWM2M applications and the LWM2M clients that have the requirement of store-latest messaging service may be simplified; and power consumption of the LWM2M clients may be decreased.

In an embodiment, the method further comprises sending the latest operation message to the client when the client becomes online.

In an embodiment, the method further comprises sending the latest operation message to the client when receiving a registration update request from the client.

In an embodiment, the attribute that indicates storing a latest operation message is set up for the operation-related resource item or an object in the client.

In an embodiment, the method further comprises creating the queue for the operation-related resource item if the queue does not exist, when receiving a request for operation on the operation-related resource item from the application.

In an embodiment, the method further comprises receiving a request enabling a queue mode from the client.

In an embodiment, the method further comprises sending an acknowledge message to the application after storing the latest operation message in the queue.

In an embodiment, the method is adapted for communication between Lightweight Machine to Machine devices.

In another aspect, there is provided a method performed in a client for communication in Internet of Things. The method comprises receiving a latest operation message from a server when the client becomes online, wherein the latest operation message is stored in a queue created for an operation-related resource item in the client in response to receiving, by the server, from an application an object definition schema including an attribute that indicates storing a latest operation message for the operation-related resource item in the client; and performing communication according to the latest operation message as received.

In an embodiment, the method further comprises receiving the latest operation message from the server when sending a registration update request to the server.

In an embodiment, the attribute that indicates storing a latest operation message is set up for an operation-related resource item or an object in the client.

In an embodiment, the method further comprises sending a request enabling a queue mode to the server device.

In an embodiment, the method is adapted for communication between Lightweight Machine to Machine devices.

In another aspect, there is provided a server for performing communication in Internet of Things. The server comprises: a memory adapted to store computer-executable instructions; and a processor adapted to perform the method of the embodiments of the present application, when the instructions are executed by the processor.

In an embodiment, the server is a Lightweight Machine to Machine, LWM2M, server.

In another aspect, there is provided a client for performing communication in Internet of Things. The client comprises: a memory adapted to store computer-executable instructions; and a processor adapted to perform the method of the embodiments of the present disclosure, when the instructions are executed by the processor.

In an embodiment, the client is a Lightweight Machine to Machine, LWM2M, client.

In still another aspect, there is provided a computer program for performing communication in Internet of Things, comprising computer program instructions, which, when executed on at least one processor on a server or a client, causes the server or the client performing the corresponding method according to embodiments of the present disclosure.

In still another aspect, there is provided a computer program medium for performing communication in Internet of Things, with computer program instructions stored thereon, which, when executed on at least one processor on a server or a client, causes the server or the client performing the corresponding method according to embodiments of the present disclosure.

In still another aspect, there is provided a computer program product for performing communication in Internet of Things, comprising a computer program and a computer program medium according to embodiments of the present disclosure.

BRIEF DESCRIPTION OF THE DRAWINGS

The above and other objectives, features, and advantages of the present disclosure will be more apparent from the following description of the embodiments of the present disclosure with reference to the attached drawings, in which.

DETAILED DESCRIPTION

Hereinafter, embodiments of the present disclosure will be described with reference to the accompanying drawings. It should be understood, however, that these descriptions are only illustrative and are not intended to limit the scope of the present disclosure. In addition, in the following description, descriptions of well-known structures and techniques are omitted so as not to unnecessarily obscure the concept of the present disclosure.

All terms (including technical and scientific terms) used herein have the same meaning as commonly understood by one of ordinary skill in the art unless otherwise defined. It should be noted that terms used herein should be construed as having a meaning that is consistent with the context of the present specification and should not be interpreted in an idealized or overly formal manner.

In the context herein, the term "server" is intended to embrace any form of servers, including physical server devices or virtual servers, especially including a Lightweight Machine to Machine (LWM2M) server; the term "client" is intended to embrace any form of clients, including physical client devices or virtual clients, especially including a Lightweight Machine to Machine (LWM2M) client.

IP-based Smart Objects (IPSO) provide a common design pattern, an object model, to provide high level interoperability between Smart Object devices and connected software applications on other devices and services. IPSO Objects are defined in such a way that they do not depend on the use of CoAP, any RESTful protocol is sufficient. Nevertheless, to develop a complete and interoperable solution the Object model is based on the OMA LWM2M.

Figure 4:
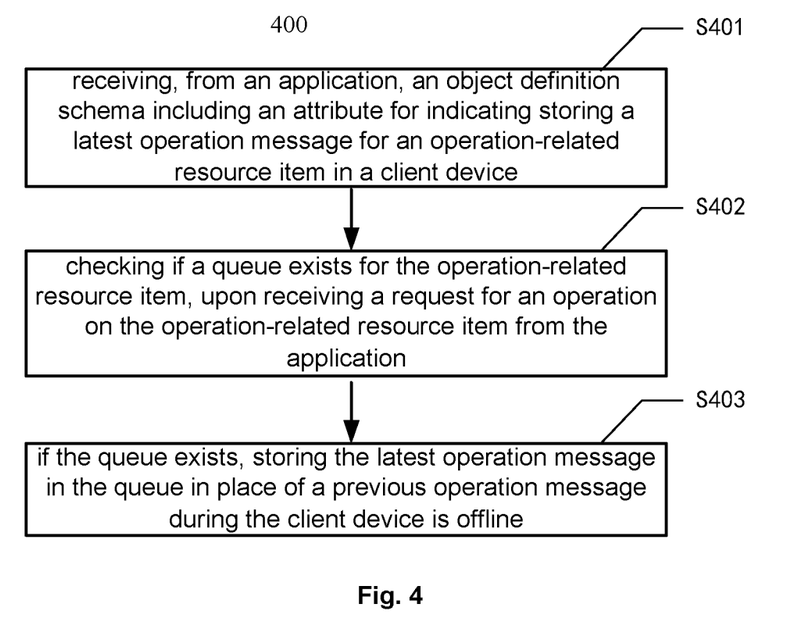
FIG. 4 schematically illustrates a diagram of a method performed in a server for communication in IoT according to an embodiment of the present disclosure.

FIG. 4 schematically illustrates a diagram of a method 400 performed in a server for communication in IoT according to an embodiment of the present disclosure.

The method 400 includes receiving S401 an object definition schema from an application. The object definition schema includes an attribute, e.g. "store-latest", which is used to instruct the server to store a latest operation message for an operation-related resource item in a client.

In the context, the term "an operation-related resource item" refers to the resource item(s) for which operations/actions may be performed.

In the context, the object definition schema may be e.g. an IP-based Smart objects schema which will be explained and exemplified hereinafter.

According to an embodiment, the attribute that indicates storing a latest operation message may be set up for one or more operation-related resource items, or for one or more objects in the client.

For example and not for limitation, the application may include, e.g., various LWM2M applications; the server may include e.g. a LWM2M server, and the client may include e.g. a LWM2M client.

The method 400 further includes checking S402 if a queue exists for the operation-related resource item, upon receiving a request for an operation on the operation-related resource item from the application.

According to an embodiment, the request for an operation may be, e.g., tuning the dimmer of a light controller to 70 (the operation range of the dimmer may be, e.g., 0-100).

The method 400 further includes, if the queue exists, storing S403 the latest operation message in the queue in place of a previous operation message when the client is offline.

According to an embodiment, if the queue does not exist, the server will create a queue for the operation-related resource item when receiving a request for operating on the operation-related resource item from the application, and store the latest operation message in the queue in place of a previous operation message when the client is offline.

The previous operation message may not exist in the queue when the queue is created initially.

According to an embodiment, the server may send the latest operation message to the client when the client becomes online again. For example, the server may send the latest operation message to the client when receiving, e.g., a registration update request from the client.

According to an embodiment, the server may receive a request for enabling a queue mode from the client. In particular, for example, the server may receive, e.g., a registration request for enabling a queue mode from the client.

Alternatively, the queue mode may be enabled via a request from the application, or may be configured by the server itself.

According to an embodiment, the server may send an acknowledge message to the application after storing the latest operation message in the queue.

For example and not for limitation, the method 400 may be applied in communications between LWM2M devices.

The embodiment of the present disclosure may simplify the implementation of the LWM2M Applications that have the requirement of store-latest messaging service since the LWM2M Applications need not always check the status of the LWM2M clients before sending the operation with the support of the LWM2M server according to the embodiment.

With the support of the LWM2M server according to the embodiment, the implementation of the LWM2M clients that have the requirement of store-latest messaging service may also be simplified since the LWM2M clients need not have logic to ignore redundant operations based on mechanisms such as time stamp or transaction ID with the support of the LWM2M server. As a result, the power consumption of the LWM2M clients may be decreased since less messages may be delivered to them.

Figure 5:
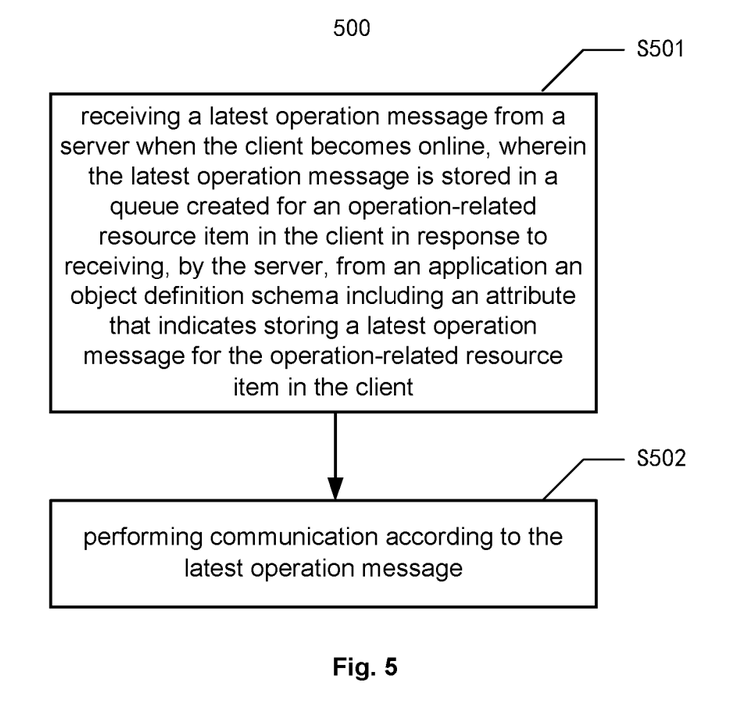
FIG. 5 schematically illustrates a diagram of a method performed in a client for communication in IoT according to an embodiment of the present disclosure.

FIG. 5 schematically illustrates a diagram of a method 500 performed in a client for communication in IoT according to an embodiment of the present disclosure.

The method 500 includes receiving S501 by the client a latest operation message from a server when the client wakes up (i.e., online). The latest operation message may be stored in a queue created for an operation-related resource item in the client when the server receives, from an application, an object definition schema. The schema may include an attribute indicating the server to store the latest operation message received for the operation-related resource item.

The method 500 may further include performing S502 communication according to the received latest operation message.

According to an embodiment, the client may receive the latest operation message from the server when the client becomes online. For example, after a registration update request is sent to the server from the client, the latest operation message, if exists in the queue in the server, will be sent from the server to the client.

The attribute indicating the server to store the latest operation message may be set up for one or more operation-related resource items or one or more objects in the client.

According to an embodiment, the client may send a request enabling a queue mode to the server. For example, the client may send a registration request enabling a queue mode to the server.

For example and not for limitation, the method 500 may be applied in communications between Lightweight Machine to Machine devices.

According to the above embodiment, the LWM2M clients that have the requirement of store-latest messaging service may be implemented easily since the LWM2M clients need not have logic to ignore redundant operations based on mechanisms such as time stamp or transaction ID with the support of the LWM2M server. In this way, the power consumption of the LWM2M clients may be improved since less messages may be delivered to them.

Hereinafter, an LWM2M schema XSD is provided as an example as below:

This example introduces a "store-latest" attribute for a Resource, which is used to inform the LWM2M server to store the latest operation for one resource item contained in an object in the client, i.e., to instruct the LWM2M server to enable a store-latest messaging service for the operation. Additionally or alternatively, the "store-latest" attribute may be set up (or enabled) for more resource items; it may also be set up for one or more objects in the client.

As an example, the "store-latest" attribute is highlighted in black and bold style in the code as below:

```
......
<xs:element name="Resources">
<xs:complexType>
    <xs:sequence>
        <xs:element maxOccurs="unbounded" name="Item">
            <xs:complexType>
                <xs:sequence>
                    ......
                    <xs:element name="Store-Latest" type="xs:boolean">
                    </xs:element>
                    ......
                </xs:sequence>
            </xs:complexType>
        </xs:element>
    </xs:sequence>
</xs:complexType>
</xs:element>
......
```

As an example of an object definition schema, the object definition schema may be, e.g., an IP-based Smart Objects schema. In particular, an IPSO Light Control schema is provided as an example as below:

With the extension proposed by the embodiment of the present disclosure, the dimmer operation of the light (corresponding to Resource ID "5851") will be extended with the attribute "Store-Latest" being "True". In other words, only the latest dimmer operation for the Resource ID "5851" will be stored. Please see the code highlighted in black and bold style as below:

```
......
<Resources>
    ......
    <Item ID="5851">
        <Name>Dimmer</Name>
        <Operations>RW</Operations>
        <Store-Latest>True</Store-Latest>
        <MultipleInstances>Single</MultipleInstances>
        <Mandatory>Optional</Mandatory>
        <Type>Integer</Type>
        <RangeEnumeration>0-100</RangeEnumeration>
        <Units>%</Units>
        <Description>This resource represents a light dimmer setting, which has an Integer value between 0 and 100 as a percentage.</Description>
    </Item>
    ......
</Resources>
......
```

With the extension, the LWM2M Application can specify which resource can be handled as store-latest by the LWM2M server.

Figure 6:
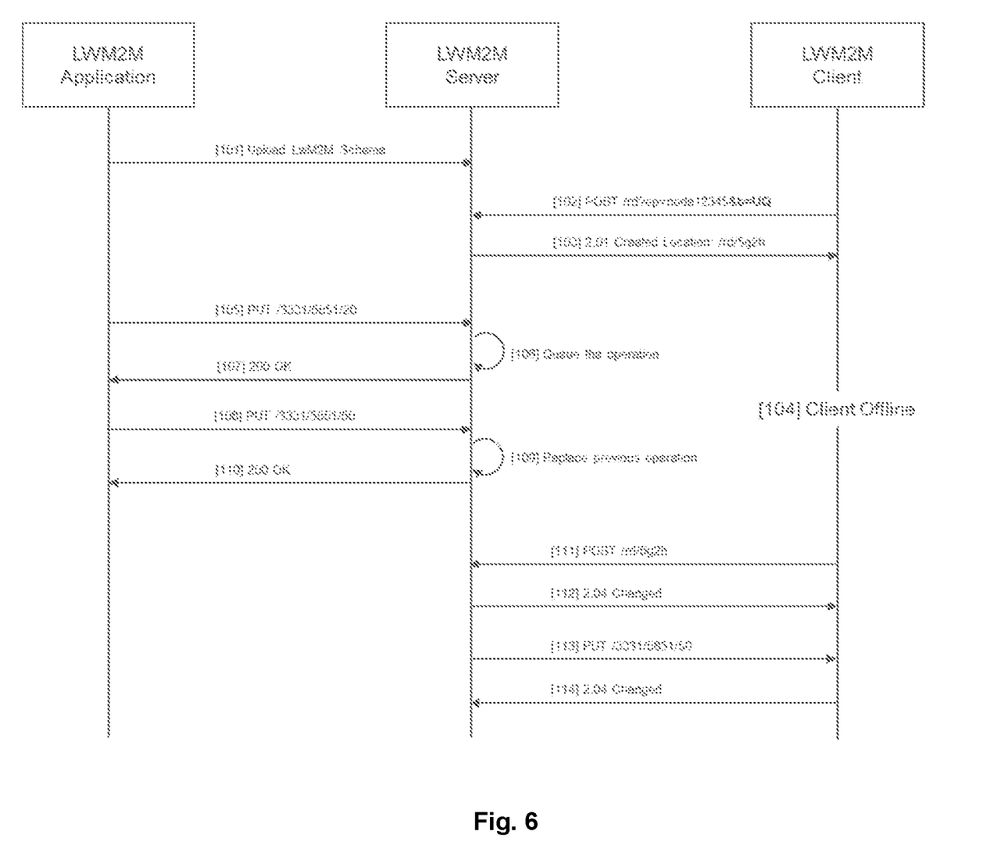
FIG. 6 schematically illustrates an operation flowchart between a server and a client according to an embodiment of the present disclosure.

FIG. 6 schematically illustrates an operation flowchart between a server and a client according to an embodiment of the present disclosure.

Herein, as an example, the server is illustrated as a LWM2M server, and the client is illustrated as a LWM2M client.

In [101], the LWM2M Application uploads the IPSO schema to the LWM2M server. For example, the schema may include a light control object "3331", with a "dimmer" resource "5851" whose "store-latest" attribute is enabled.

In [102], the LWM2M client may register to the LWM2M server, enabling the queue mode.

In [103], the LWM2M server may acknowledge the LWM2M client.

In [104], the LWM2M client goes offline.

In [105], the LWM2M Application may send an operation request to the LWM2M server to change the dimmer to 20.

In [106], if the LWM2M server finds out that:
1. The LWM2M client has enabled the queue mode;
2. It is an operation on 3331/5851, whose "store-latest" attribute is enabled;
3. There is no queue created for the operation-related resource item of the client (i.e., "3331/5851") before, then, the LWM2M server may create a specific queue for this client and this type of operation for the resource item, and put this operation in the queue.

In [107], the LWM2M server may acknowledge the LWM2M Application.

In [108], the LWM2M Application may send another operation request to the LWM2M server to change the dimmer to 50.

In [109], if the LWM2M server finds out that:
1. The LWM2M client has enabled the queue mode;
2. It is an operation on 3331/5851, whose "store-latest" attribute is enabled;
3. There is already an existing queue for the operation-related resource item of the client (i.e., "3331/5851"), Then, the LWM2M server may replace previous operation(s), if exists, in the queue with the latest one.

In [110], the LWM2M server may acknowledge the LWM2M Application.

In [111], the LWM2M client may send a registration update request to LWM2M server when the client is online (i.e., wakes up).

In [112], the LWM2M server may acknowledge the LWM2M client.

In [113], the LWM2M server may send the latest operation to the LWM2M client, which may change the dimmer to 50.

In [114], the LWM2M client may receive the operation request and acknowledge the LWM2M server.

In this example, the LWM2M client is a smart light, and the operation is light control command. According to the embodiment of the present disclosure, the smart light need not and will not receive all the historical operation commands during its sleeping period, but just the latest command when it wakes up, i.e., tunes the light dimmer to 50 accordingly.

In another example, the LWM2M client may be a smart lock, and the operation may be a remote lock/unlock command. The smart lock need not and will not receive all the historical lock/unlock commands during its sleeping period, but just the latest command when it wakes up to perform the operation accordingly.

This significantly reduces the workload of the client (e.g., the LWM2M client) and the Application side (e.g., the LWM2M Application), and reduces the power consumption of the client.

Figure 7:
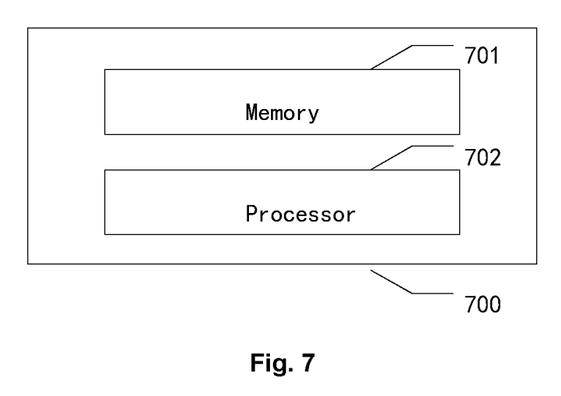
FIG. 7 schematically illustrates a block diagram of a server for performing communication in IoT according to an embodiment of the present disclosure.

FIG. 7 schematically illustrates a block diagram of a LWM2M server 700 for performing communication in IoT according to an embodiment of the present disclosure.

The LWM2M server 700 includes a memory 701 and a processor 702. The memory 701 may store computer-executable instructions; and when the computer-executable instructions are executed by the processor, the LWM2M server 700 is configured to receive, from an application, an object definition schema including an attribute that indicates storing a latest operation message for an operation-related resource item in a client and to check if a queue exists for the operation-related resource item, upon receiving a request for an operation on the operation-related resource item from the application. The LWM2M 700 is further configured to, if the queue exists, store the latest operation message in the queue in place of a previous operation message when the client is offline.

Alternatively, the LWM2M server may include a receiving unit configured to receive, from an application, an object definition schema including an attribute that indicates storing a latest operation message for an operation-related resource item in a client and a checking unit configured to check if a queue exists for the operation-related resource item, upon receiving a request for an operation on the operation-related resource item from the application. The LWM2M server 700 also includes a storing unit configured to, if the queue exists, store the latest operation message in the queue in place of a previous operation message when the client is offline For example and not for limitation, the server may be, e.g., an LWM2M server.

Figure 8:
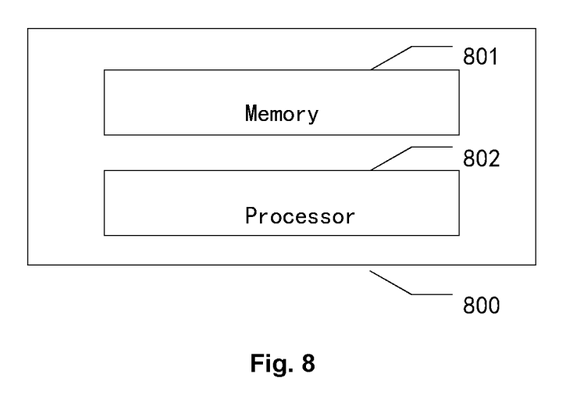
FIG. 8 schematically illustrates a block diagram of a client for performing communication in IoT according to an embodiment of the present disclosure.

FIG. 8 schematically illustrates a block diagram of a LWM2M client 800 for performing communication in IoT according to an embodiment of the present disclosure.

The LWM2M client 800 may include a memory 801 and a processor 802. The memory 801 may store computer-executable instructions. When the computer-executable instructions are executed by the processor, the LWM2M client 800 is configured to receive a latest operation message from a server when the client wakes up. The latest operation message is stored in a queue created for an operation-related resource item in the client in response to receiving, by the server, from an application an object definition schema including an attribute that indicates storing a latest operation message for the operation-related resource item in the client. The LWM2M client 800 may be further configured to perform communication according to the latest operation message as received.

Alternatively, the LWM2M client may include a receiving unit configured to receive a latest operation message from a server when the client wakes up. The latest operation message is stored in a queue created for an operation-related resource item in the client in response to receiving, by the server, from an application an object definition schema including an attribute that indicates storing a latest operation message for the operation-related resource item in the client. The LWM2M client may further include a performing unit configured to perform communication according to the latest operation message as received.

For example and not for limitation, the client may be, e.g., an LWM2M client.

According to an embodiment, a computer program may be provided for performing communication in IoT. The computer program may comprise computer program instructions, which, when executed on at least one processor on a server or a client, may cause the server or the client to perform the corresponding method according to embodiments of the present disclosure.

According to an embodiment, a computer program medium may also be provided for performing communication in IoT. With computer program instructions stored thereon, the computer program medium may, when the computer program instructions are executed by at least one processor on a server or a client, cause the server or the client to perform the corresponding method according to embodiments of the present disclosure.

According to an embodiment, a computer program product may be provided for performing communication in IoT, which may include the computer program and the computer program medium as illustrated above.

In conclusion, the embodiments of the present disclosure may provide the method and apparatus supporting the Store-Latest Messaging Service for Constrained Devices. In particular, the LWM2M server may be enhanced to support the store-latest messaging service which is not yet in LWM2M specification.

The embodiments of the present disclosure may significantly simplify the implementation of both LWM2M Applications and clients that have requirement on store-latest messaging service.

The embodiments of the present disclosure may improve the power consumption of constrained devices because with store-latest messaging service, the constrained device may receive less messages from LWM2M server.

The embodiments of the present disclosure may extend the IPSO/LWM2M schema where the LWM2M Application may define the operations that need the Store-Latest Messaging Service based on requirements.

The embodiments of the present disclosure may keep the interfaces between LWM2M Applications and clients unchanged, thus simplifying the implementation.

In the context, the "memory" herein may be implemented using any suitable data storage technology, including but not limited to semiconductor-based memory devices, magnetic memory devices and systems, optical memory devices and systems, fixed memories and removable memories.

The processor herein may include but not limited to one or more of a general purpose computer, a special purpose computer, a microprocessor, a digital signal processor DSP, and a processor based on a multi-core processor architecture.

A "computer-readable medium" as used herein shall be taken to include any medium or combination of mediums capable of storing instructions executed by a computer, a device capable of temporarily or permanently storing instructions and data, and may include, but is not limited to, random access memory (RAM), read only memory (ROM), buffer memory, flash memory, optical media, magnetic media, cache memory, other types of memory (e.g., erasable programmable read-only memory (EEPROM)) and/or any suitable combination thereof. A "computer-readable medium" can refer to a single storage apparatus or device and/or a "cloud-based" storage system or storage network including multiple storage apparatuses or devices.

The terminology used herein is for the purpose of describing particular embodiments only and is not intended to be limiting of the disclosure. Furthermore, the terms "including", "comprising", or the like, as used herein, indicate the presence of stated features, steps, operations, and/or components, but does not preclude the presence or addition of one or more other features, steps, operations, or components.

Each block in the flowcharts or block diagrams in the embodiments of the present disclosure may represent a hardware module, a program segment, or a part of code, and the above-mentioned module, program segment, or part of code may include one or more of executable instructions for implementing specified logic functions.

It should also be noted that in some alternative implementations, the functions annotated in the flowcharts and blocks may also occur in a different order than that indicated in the figures. For example, two consecutively represented blocks may be executed substantially in parallel, and they may sometimes be executed in the reverse order, depending on the function involved.

It should also be noted that each block in the block diagrams or the flowcharts, and combinations of blocks in the block diagrams or the flowcharts may be implemented by a dedicated hardware-based system that performs specified functions or operations, or may be implemented by a combination of the dedicated hardware and computer instructions.

The embodiments of the present disclosure have been described above. However, these examples are for illustrative purposes only and are not intended to limit the scope of the present disclosure. Although the respective embodiments are described above respectively, this does not mean that the measures in the respective embodiments cannot be advantageously used in combination. The scope of the disclosure is defined by the appended claims and their equivalents. Numerous substitutions and modifications may be made by those skilled in the art without departing from the scope of the present disclosure, and such substitutions and modifications should fall within the scope of the present disclosure.

The invention claimed is:

1. A method performed in a server for communication in Internet of Things, the method comprising:
   receiving, from an application, an object definition schema including an attribute that indicates storing a latest operation message for an operation-related resource item in a client;
   checking if a queue exists for the operation-related resource item, upon receiving a request for an operation on the operation-related resource item from the application; and
   if the queue exists, storing the latest operation message in the queue in place of a previous operation message when the client is offline.

2. The method as claimed in claim 1, further comprising: sending the latest operation message to the client when the client becomes online.

3. The method as claimed in claim 2, further comprising: sending the latest operation message to the client when receiving a registration update request from the client.

4. The method as claimed in claim 2, wherein the attribute that indicates storing the latest operation message is set up for one of the operation-related resource item and an object in the client.

5. The method as claimed in claim 2, further comprising: creating the queue for the operation-related resource item if the queue does not exist, when receiving the request for the operation on the operation-related resource item from the application.

6. The method as claimed in claim 1, further comprising: sending the latest operation message to the client when receiving a registration update request from the client.

7. The method as claimed in claim 1, wherein the attribute that indicates storing the latest operation message is set up for one of the operation-related resource item and an object in the client.

8. The method as claimed in claim 1, further comprising: creating the queue for the operation-related resource item if the queue does not exist, when receiving the request for the operation on the operation-related resource item from the application.

9. The method as claimed in claim 1, further comprising: receiving a request enabling a queue mode from the client.

10. The method as claimed in claim 1, further comprising: sending an acknowledge message to the application after storing the latest operation message in the queue.

11. The method as claimed in claim 1, wherein the method is adapted for communication between Lightweight Machine to Machine devices.

12. A method performed in a client for communication in Internet of Things, the method comprising:
    receiving a latest operation message from a server when the client becomes online, wherein the latest operation message is stored in a queue created for an operation-related resource item in the client in response to receiving, by the server, from an application an object definition schema including an attribute that indicates storing the latest operation message for the operation-related resource item in the client; and
    performing communication according to the latest operation message.

13. The method as claimed in claim 12, further comprising:
    receiving the latest operation message from the server after sending a registration update request to the server.

14. The method as claimed in claim 12, wherein the attribute that indicates storing the latest operation message is set up for one of the operation-related resource item and an object in the client.

15. The method as claimed in claim 12, further comprising:
    sending a request enabling a queue mode to the server.

16. The method as claimed in claim 12, wherein the method is adapted for communication between Lightweight Machine to Machine devices.

17. A server for performing communication in Internet of Things, the server comprising:
    a memory configured to store computer-executable instructions; and
    a processor configured to:
        receive from an application, an object definition schema including an attribute that indicates storing a latest operation message for an operation-related resource item in a client;
        check if a queue exists for the operation-related resource item, upon receiving a request for an operation on the operation-related resource item from the application; and
        if the queue exists, store the latest operation message in the queue in place of a previous operation message when the client is offline.

18. The server as claimed in claim 17, wherein the server is a Lightweight Machine to Machine, LWM2M, server.

19. A client for performing communication in Internet of Things, the client comprising:
    a memory configured to store computer-executable instructions; and
    a processor configured to:
        receive a latest operation message from a server when the client becomes online, wherein the latest operation message is stored in a queue created for an operation-related resource item in the client in response to receiving, by the server, from an application an object definition schema including an attribute that indicates storing the latest operation message for the operation-related resource item in the client; and
        perform communication according to the latest operation message.

20. The client as claimed in claim 19, wherein the client is a Lightweight Machine to Machine, LWM2M, client.

* * * * *